Patented Dec. 2, 1952

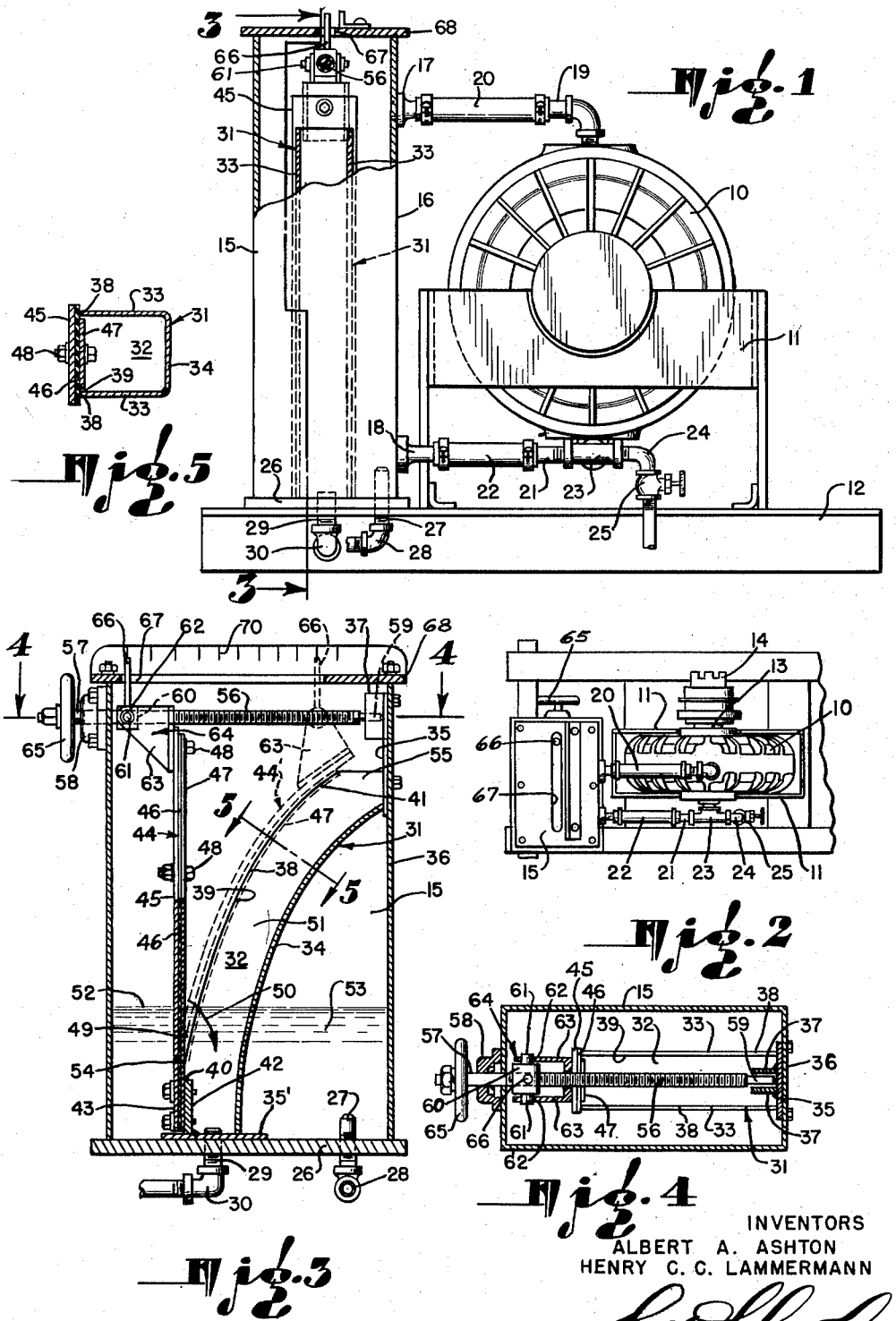

2,619,984

UNITED STATES PATENT OFFICE 2,619,984

FLUID LEVEL CONTROL

Albert A. Ashton and Henry C. C. Lammermann, Houston, Tex., assignors to Emsco Derrick & Equipment Company, Los Angeles, Calif., a corporation of California Application May 21, 1948, Serial No. 28,395

6 Claims. (Cl. 137—577)

Our invention relates to a liquid reservoir having simple means for quickly varying the height of liquid therein, and is of especial utility as a means for controlling hydraulic brakes of the type employed on draw-works of well drilling rigs and the like. In this respect, the invention is an improvement on the liquid level control for hydraulic brakes disclosed in Patent No. 2,363,821 granted November 28, 1944, to Samuel W. Webster.

It is an object of the present invention to provide a simple and effective means for controlling the height of the level of a liquid, such as water, in a container, and to thereby provide means for controlling the braking effect of a hydraulic brake connected to the container.

A further object of the invention is to provide a liquid level control for a container of this character which is simple in form and may be easily adjusted as may be required by different conditions of operation.

It is a further object of the invention to provide a means for varying the height of a column of water in a container, into which container there is a continuous flow of water, this control means providing an outlet member having a mouth which extends from a point near the bottom of the container to a point near the top of the container, and a flexible closure element arranged to be flexed so that, from the bottom upward, the flexible member will be progressively brought into closing relation to the mouth of the outlet member as the upper end of the flexible member is moved toward the upper end of the mouth.

Further objects and advantages of the invention will be perceived from the following part of the specification, wherein we have described details of a preferred form of the invention for the purpose of making a clear and complete disclosure without limiting the scope of the invention which is defined by the appended claims.

Referring to the drawings which are for illustrative purposes only,

Fig. 1 is an end elevation, partly sectioned, showing a preferred embodiment of the invention as connected to a hydraulic brake.

Fig. 2 is a plan view, to reduced scale, corresponding to Fig. 1.

Fig. 3 is a sectional view taken as indicated by the line 3—3 of Fig. 1, showing the level control mechanism within the container.

Fig. 4 is a sectional view taken as indicated by the line 4—4 of Fig. 3.

Fig. 5 is a sectional view taken as indicated by the line 5—5 of Fig. 3.

Figs. 1 and 2 show a hydraulic brake 10 supported by a cradle 11 on a base 12. This brake 10 has a projecting shaft 13 provided with a clutch 14 for connection to the end of the drum shaft of a drawworks.

At one side of the hydraulic brake 10 a container 15 is supported on the base 12, the vertical height of this container 15 being at least as great as the vertical dimension of the brake 10. The wall 16 of the container 15 proximal to the brake 10 is provided with threaded fittings 17 and 18 whereby the interior of the container 15 may be connected to the interior of the brake 10. The fitting 17 is shown connected to the upper portion of the brake 10 by piping 19 which includes a length of flexible tubing 20, and the fitting 18 is shown connected to the lower portion of the brake 10 by piping 21 including a flexible tube 22 and a T fitting 23, from which extends water inlet piping 24 equipped with a valve 25.

As shown in Figs. 1 and 3, the container 15 has in its bottom wall a drain 27 and a fitting 29 to which may be connected return piping 30 through which water from the container 15 may flow back through to a main water reservoir or to other means of water disposal.

Within the container 15 there is a variable height overflow member 31, the lower end of which is connected to the fitting 29, so that water which overflows through the member 31 will be conducted to the piping 30. As shown in Figs. 3 and 4, the overflow member 31 comprises a metal channel 32 having spaced side walls 33 and an interconnecting wall 34. The channel 31 is connected to and extends upwardly from a face plate or flange 35' and as it extends upwardly, it curves laterally away from vertical. The upper end of the channel 32 has a plate 35 which is secured to the upper portion of a side wall 36 of the container 15. The upper portion of the plate 35 has a pair of inwardly extending vertically disposed plates 37 providing guide means, the purpose of which will be later explained.

The curved lips 38 of the channel side walls 33 define a mouth 39 for the overflow member, which mouth extends from a point 40 near the bottom of the container 15 to a position 41 near the upper end of the container 15. Below the lower end of the mouth 39, the flange 35' carries a vertical plate 42 to which the lower end 43 of a flexible closure member 44 is secured. This flexible closure member 44 includes a leaf spring member 45 of a width greater than the width of the mouth 39, and on the face of the spring member 45 facing the mouth 39 a sealing member 46 is supported. This sealing member 46 consists of a layer of yieldable material, such as rubber or an impregnated fabric. It is held against the face of the spring member 45 by metal strips 47 which lie along the opposite edges of the spring member 45 and are secured thereto by small bolts 48.

When the flexible closure member 44 is in the vertical position in which it is shown in Fig. 3, water from the interior of the container 15 will flow through the lowest portion 49 of the space between the closure member 44 and the lips 38 which define the mouth 39 of the outlet member 31. This water will flow as indicated by arrow 50 into the path of flow 51 defined by the channel 32 of the outlet member 31 and will pass from the lower end of the outlet member 31 to the piping 30. Therefore, the level 52 of the water 53 in the container 15 will be spaced a short distance from the point of engagement 54 of the flexible closure member 44 with the lips 38 of the channel 32, the exact distance of the level 52 above the point of engagement 54 being determined by the rate of flow of water into the container 15. As the flexible member 44 is swung rightwardly from the position in which it is shown in full lines toward its dotted line position 44', the point of engagement 54 of the closure member 44 with the lips 38 will rise, and when the flexible closure member 44 reaches the position shown by dotted lines 44', the closure member 44 will engage the lips 38 along their full extent and at that time, the only communication between the interior of the container 15 and the duct or path of flow 51 provided by the overflow member 31 will be the upper end 55 thereof. Accordingly, by swinging the flexible closure member 44 between the extreme positions thereof indicated in Fig. 3, the level 52 of the water 53 in the container 15 may be raised or lowered.

The invention provides simple means for swinging the flexible closure member 44 between the full line position thereof and the dotted line position 44' thereof, this means comprising a screw 56 disposed horizontally in the upper portion of the container 15 above the upper end of the flexible closure member 44, this screw having its forward end 57 extending through a valve screw bearing 58 mounted at the upper end of the side wall of the container 15, having the rearward end 59 thereof disposed between the guide plates 37, which limit lateral movement of the rear end 59 of the screw 56, but permit such vertical movement of the rear end 59 as may occur during the operation of the device. Threaded on the screw 56 there is a nut member 60 having laterally extending trunnions 61 which engage openings 62 in the side plates 63 of a bracket 64 which is secured to the upper end of the leaf spring member 45, so that the openings 62 will be faced away from the rear face of the spring member 45 a distance accomplishing a position of the trunnions 61 with relation to the rear face of the spring member 45 which will result in a substantially horizontal movement of the trunnions 61 as the flexible closure member 44 is swung between the full line and dotted line positions thereof, Fig. 3. By means of a handle 65 fixed on the outer end of the screw 56, this screw may be rotated so as to move the nut 60 and thereby swing the upper end of the flexible closure member 44 as may be required to establish the desired level 52 of water 53 in the container 15.

For indicating the water level 52 which adjustment of the closure member 44 effects within the container 15, an indicator pin 66 is projected upwardly from the nut 60 through a slot 67 in the top plate 68 of the container 15. Along the slot 67 a dial plate 69 is secured to the top plate 68. This dial plate 69 has therein indicia 70 for indicating the adjustment of the flexible closure member 44 and therefore the instant water level in the container 15.

We claim as our invention:

1. In a variable height liquid supply means for use with a liquid utilizing device, the combination of: walls forming a container adapted for connection with said device, inlet means for connecting the interior of the container with a source of liquid whereby a flow of liquid may be fed into the container, and an outlet in the lower portion of said container; and variable height outlet duct means for controlling the level of liquid in said container, comprising a channel having the lower portion thereof connected to said outlet and having lips extending upwardly and curving away from vertical, a flexible member adapted for engagement with said lips so as to cooperate with said channel to form a duct, the lower end of which communicates with said outlet, said flexible member being supported in upwardly extending position and with its lower end contiguous to the lower end of said lips of said channel member, a screw extending in the upper portion of said container, a nut on the threads of said screw, means connecting said nut to the upper end of said flexible member, and means on the exterior of said container for rotating said screw so that said nut will swing the upper end of said flexible member toward and away from the upper ends of said lips.

2. In a variable height liquid supply means for use with a liquid utilizing device, the combination of: walls forming a container adapted for connection with said device, and inlet means for connecting the interior of the container with a source of liquid whereby a flow of liquid may be fed into the container; and variable height outlet duct means for controlling the level of liquid in said container, comprising walls forming a path of flow of liquid out of said container, said walls being formed so as to define a mouth extending from a point near the lower end of said container to a point near the upper end of said container, a flexible member having its lower portion connected contiguous to the lower extremity of said mouth, a screw supported in the upper portion of said container, means for rotating said screw, a traveling member for engagement with the threads of said screw so that rotation of said screw will cause movement of said traveling member, and means connecting said traveling member to the upper portion of said flexible member so as to effect movement of the upper end of said flexible member toward and away from the upper portion of said mouth, thereby flexing said flexible member so as to bring portions thereof into closing relation to said mouth, progressively upwardly from the lower end of said mouth and in this manner determining the level at which liquid may overflow from the interior of said container into said outlet duct means.

3. In a variable height liquid supply means for use with a liquid utilizing device, the combination of: walls forming a container adapted for connection with said device, inlet means for connecting the interior of the container with a source of liquid whereby a flow of liquid may be fed into the container, and an outlet in the lower portion of said container; and variable height outlet duct means for controlling the level of liquid in said container, comprising a channel member having the lower portion thereof connected to said outlet and having lips extending upwardly and curving away from vertical, a resilient leaf supported in upwardly extending position and with its lower end contiguous to the lower end of said lips of said channel member, said leaf having the characteristics of a spring so that its upper end may be swung from a position close to the upper ends of said lips, at which time said leaf is curved to correspond to the curvature of said lips and to engage said lips, to a position spaced laterally from the upper ends of said lips, the edges of said leaf and said lips then defining a pair of upwardly expanding wedge shaped flow openings, a screw extending in the upper portion of said container, a nut on the threads of said screw, means connecting said nut to the upper end of said leaf, and means on the exterior of said container for rotating said screw so that said nut will swing the upper end of said leaf toward and away from the upper ends of said lips.

4. In a variable height liquid supply means for use with a liquid utilizing device, the combination of: walls forming a container adapted for connection with said device, inlet means for connecting the interior of the container with a source of liquid whereby a flow of liquid may be fed into the container, and an outlet in the lower portion of said container; and variable height outlet duct means for controlling the level of liquid in said container, comprising a channel member having the lower portion thereof connected to said outlet and having lips extending upwardly and curving away from vertical, a resilient member adapted for engagement with said lips so as to cooperate with said channel to form a duct, the lower end of which communicates with said outlet, said resilient member being supported in upwardly extending position and with its lower end contiguous to the lower ends of said lips of said channel member and having the characteristics of a spring arranged to be bent from a curved position in engagement with said lips and with its upper portion in engagement with the upper portions of said lips, to a position of lesser curvature wherein the upper portion will be spaced laterally outwardly from the upper portions of said lips so that the edges of said flexible member and said lips will define a pair of upwardly expanding wedge shaped flow openings, and a member movable laterally toward and away from the upper end of said channel and being operative to swing the upper end of said resilient member toward and away from the upper ends of said lips.

5. In a variable height liquid supply means for use with a liquid utilizing device, the combination of: walls forming a container adapted for connection with said device, and inlet means for connecting the interior of the container with a source of liquid whereby a flow of liquid may be fed into the container; and variable height outlet duct means for controlling the level of liquid in said container, comprising walls forming a path of flow of liquid out of said container, said walls being formed so as to define a mouth extending from a lower level to a higher level of said container, a closure member having its lower portion connected contiguous to the lower extremity of said mouth and its upper portion spaced laterally from the upper portion of said mouth so as to define between the edges of said member and the lateral edge walls of said mouth a pair of flow openings substantially from bottom to top of said mouth and of wedge shape and expanding upwardly from the lower to the upper ends thereof, and means for effecting movement of the upper end of said member toward and away from the upper portion of said mouth, thereby changing the size of said wedge shaped flow openings and determining the level at which liquid may overflow from the interior of said container into said outlet duct means.

6. In a variable height liquid supply means for use with a liquid utilizing device, the combination of: walls forming a container adapted for connection with said device, and inlet means for connecting the interior of the container with a source of liquid whereby a flow of liquid may be fed into the container; and variable height outlet duct means for controlling the level of liquid in said container comprising an upwardly extending channel member having a laterally directed mouth and a flexible cover member having its lower end connected contiguous to the lower end of said channel member and defining, when the upper ends of said members are spaced apart, a pair of upwardly expanding wedge shaped flow openings, at least one of said members being so curved that when the upper end of said flexible member is moved closer to the upper end of said channel member the flexible member will be flexed and will be brought gradually into engagement with said channel member progressively from the lower end to the upper end thereof, thereby progressively raising the lower ends of said wedge shaped flow openings, and means operative from the exterior of said container to effect relative movement of said members together and apart.

ALBERT A. ASHTON.
HENRY C. C. LAMMERMANN.

REFERENCES CITED

The following references are of record in the file of this patent:

UNITED STATES PATENTS

| Number | Name | Date |
| --- | --- | --- |
| 703,315 | Smith | June 24, 1902 |
| 1,013,075 | Scott | Dec. 26, 1911 |
| 1,138,994 | Steele | May 11, 1915 |
| 1,556,328 | Hutchins | Oct. 6, 1925 |
| 1,618,151 | Fisher | Feb. 15, 1927 |
| 2,102,991 | Briggs | Dec. 21, 1937 |
| 2,224,208 | Acer | Dec. 10, 1940 |
| 2,363,821 | Webster | Nov. 28, 1944 |

FOREIGN PATENTS

| Number | Country | Date |
| --- | --- | --- |
| 132,216 | Austria | Mar. 10, 1933 |
| 536,543 | Great Britain | May 19, 1941 |